United States Patent [19]

Watanabe

[11] 4,186,593
[45] Feb. 5, 1980

[54] DRIVE SIMULATOR OPERATING METHOD

[75] Inventor: Youichi Watanabe, Kamakura, Japan

[73] Assignee: Kabushiki Kaisha Meidensha, Tokyo, Japan

[21] Appl. No.: 933,613

[22] Filed: Aug. 14, 1978

[30] Foreign Application Priority Data

Aug. 16, 1977 [JP] Japan .................................. 52-98091

[51] Int. Cl.² ............................................ G01M 15/00
[52] U.S. Cl. ...................................................... 73/117
[58] Field of Search ........................... 73/117, 116, 134

[56] References Cited

U.S. PATENT DOCUMENTS

| | | | |
|---|---|---|---|
| 3,516,287 | 6/1970 | Masuda et al. | 73/117 |
| 3,926,043 | 12/1975 | Marshall et al. | 73/117 |

*Primary Examiner*—Jerry W. Myracle
*Attorney, Agent, or Firm*—J. Harold Nissen

[57] ABSTRACT

A drive simulator operating method for permitting a test vehicle to run on a dynamometer system under conditions equivalent to actual vehicle running conditions. The drive simulator is operated under road load control on the basis of the data stored in a memory while the test vehicle runs on the dynamometer system under road load control in accordance with road load command values stored in a data recorder during actual running of the test vehicle on a test course.

5 Claims, 2 Drawing Figures

DRIVE SIMULATOR OPERATING METHOD

BACKGROUND OF THE INVENTION

1. Field of the Invention

The invention relates to a drive simulator operating method and, more particularly, to a method for operating a drive simulator including a chassis dynamometer system such that a test vehicle thereon can be driven under conditions equivalent to the conditions where the test vehicle is actually driven on a test course.

2. Description of the Prior Art

In conducting various tests on a test vehicle with a gasoline engine, diesel engine, or the like, it is common practice to utilize a drive simulator which normally includes a chassis dynamometer system having therein a direct-current or eddy current dynamometer and a control system for controlling the operation of the drive simulator so that the test vehicle can be driven under conditions equivalent to the conditions where the test vehicle is actually driven on a test course. It is also well known in the art to operate such a drive simulator under the road load control of applying to the dynamometer a road load command expressed by $$T = A + BV^2 \pm W\sin\theta + dv/dt \cdot W \quad (1)$$

where A is the rolling resistance, $BV^2$ is the wind resistance, $W\sin\theta$ is the acclivity and declivity load, $dv/dt \cdot W$ is the inertia term, and W is the weight of the vehicle. Such a conventional drive simulator operating method will be described in more detail with reference to FIG. 1 which is a block diagram of a prior art drive simulator. The drive simulator comprises a chassis dynamometer system and a control system. The chassis dynamometer system includes a dynamometer 1 having its rotary drive shaft coupled to a flywheel unit 2 and also to a roller unit 3 on which a test vehicle 4 is placed. The control system includes a torque detector 5 such as including a load cell for detecting the torque of the rotary drive shaft to provide it to one input terminal of a comparator 6, and a speed detector 7 such as including a pulse pick-up associated with the rotary drive shaft for detecting the speed V of the test vehicle. The vehicle speed V is delivered to a first arithmetic circuit 8 where it is converted into the differential of the speed V which in turn is introduced into an inertia term setting circuit 9 having a function of providing an output $dv/dt \cdot W$ which represents an inertia term value. The vehicle speed V detected by the speed detector 7 is also delivered into a second arithmetic circuit 10 where it is converted into the square of the speed value V which in turn is introduced into a wind resistance setting circuit 11 having a function of providing an output $BV^2$ which represents a wind resistance value. Designated by the reference numeral 12 is a rolling resistance setting circuit through which the operator manually sets a fixed rolling resistance value A obtained from the design drawing of the test course and designated at 13 is an acclivity/declivity load setting circuit through which the operator manually sets a fixed acclivity/declivity load value $W\sin\theta$ obtained also from the design drawing of the test course. The outputs from these setting circuits 9, 11, 12 and 13 are introduced into an adder 14 which adds them to provide a road load command value expressed by equation (1) to the other input terminal of the comparator. The comparator 6 compares the road load command value with the rotary drive shaft torque value detected by and delivered from the torque detector 5 to provide a command signal to a dynamometer control circuit 5 which controls the operation of the dynamometer in accordance with the command signal.

One of the difficulties encountered with such a prior art drive simulator operating method is that there is a divergency between simulated conditions and actual vehicle running conditions. This serious difficulty stems mainly from the way to provide the road load command value while disregarding the following factors. First, since it is very difficult to calculate, on the basis of the design drawing of the test course, an acclivity/declivity load command value for all of the ascents and descends existing on the test course, it is normal practice to manually set a fixed acclivity/declivity load command value calculated from values plotted for properly selected ascents and descends. Such an acclivity/declivity load command value cannot correctly correspond to the ascents and descends actually existing on the test course. Second, although a wind resistance command value is selected and set under such an assumption that wind resistance is dependent merely upon test vehicle speed, the wind resistance exerted on the test vehicle is greatly dependent upon the weather condition, particularly upon wind speed and direction. Third, the load exerted on the test vehicle running on a curved road is greatly different from the load exerted on the test vehicle running on a straight road.

Therefore, it will be apparent that the prior art drive simulator operating method where the road load command is determined without regarding many factors such as test course curves and weather conditions and with setting an acclivity/declivity load value in a rough manner cannot provide simulated conditions accurately equivalent to the actual vehicle running conditions.

SUMMARY OF THE INVENTION

Therefore, it is an object of the present invention to provide an improved and novel drive simulator operating method which can provide simulated conditions equivalent to the actual vehicle running conditions with great accuracy.

Another object of the present invention is to provide an improved and novel drive simulator operating method of the above character which is simple and inexpensive to carry out.

Still another object of the present invention is to provide an improved and novel drive simulator operating method of the above character which is suitable particularly in conducting tests on vehicle transient performances under engine acceleration and deceleration conditions.

In accordance with the present invention, there is provided an improved and novel drive simulator operating method for permitting a test vehicle to run on the dynamometer system under conditions equivalent to actual vehicle running conditions, the method comprising the steps of storing in a data recorder data on the relationship between vehicle speed and any one of engine throttle opening, intake manifold pressure, and rotary drive shaft torque while actually driving the test vehicle on a test course in accordance with a patterned drive mode, storing in a memory data on the relationship between vehicle speed and road load while driving the test vehicle on the dynamometer system under road load control in accordance with the data stored in the data recorder, and operating the dynamometer under road load control in accordance with the data stored in the memory.

BRIEF DESCRIPTION OF THE DRAWINGS

A better understanding of the present invention as well as other objects and further features thereof will become apparent upon consideration of the following detailed disclosure thereof, especially when taken in connection with the accompanying drawings.

DESCRIPTION OF THE PREFERRED EMBODIMENT

Figure 1:
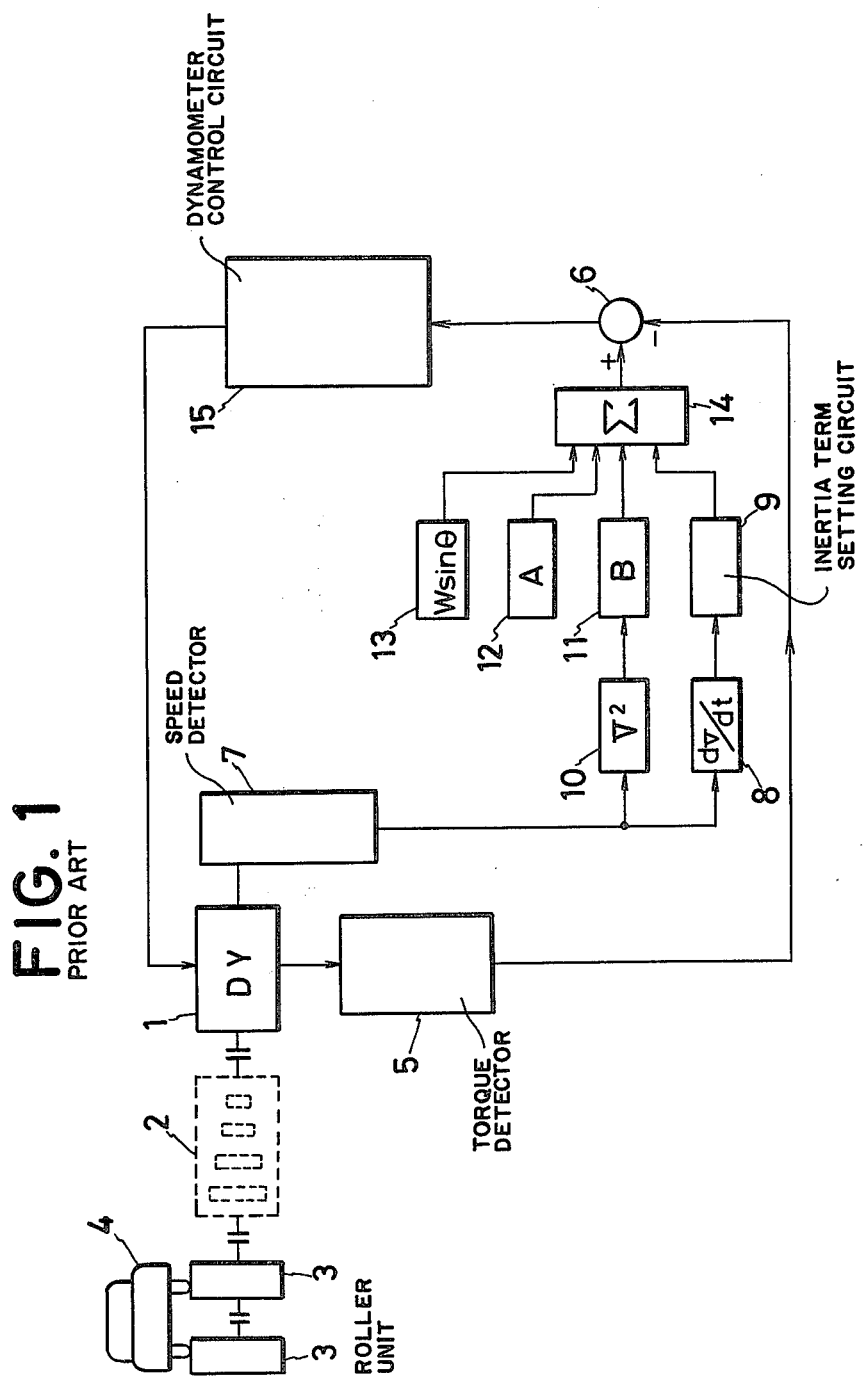
FIG. 1 is a block diagram showing a prior art drive simulator used to explain the disadvantages found in a conventional drive simulator operating method.
Figure 2:
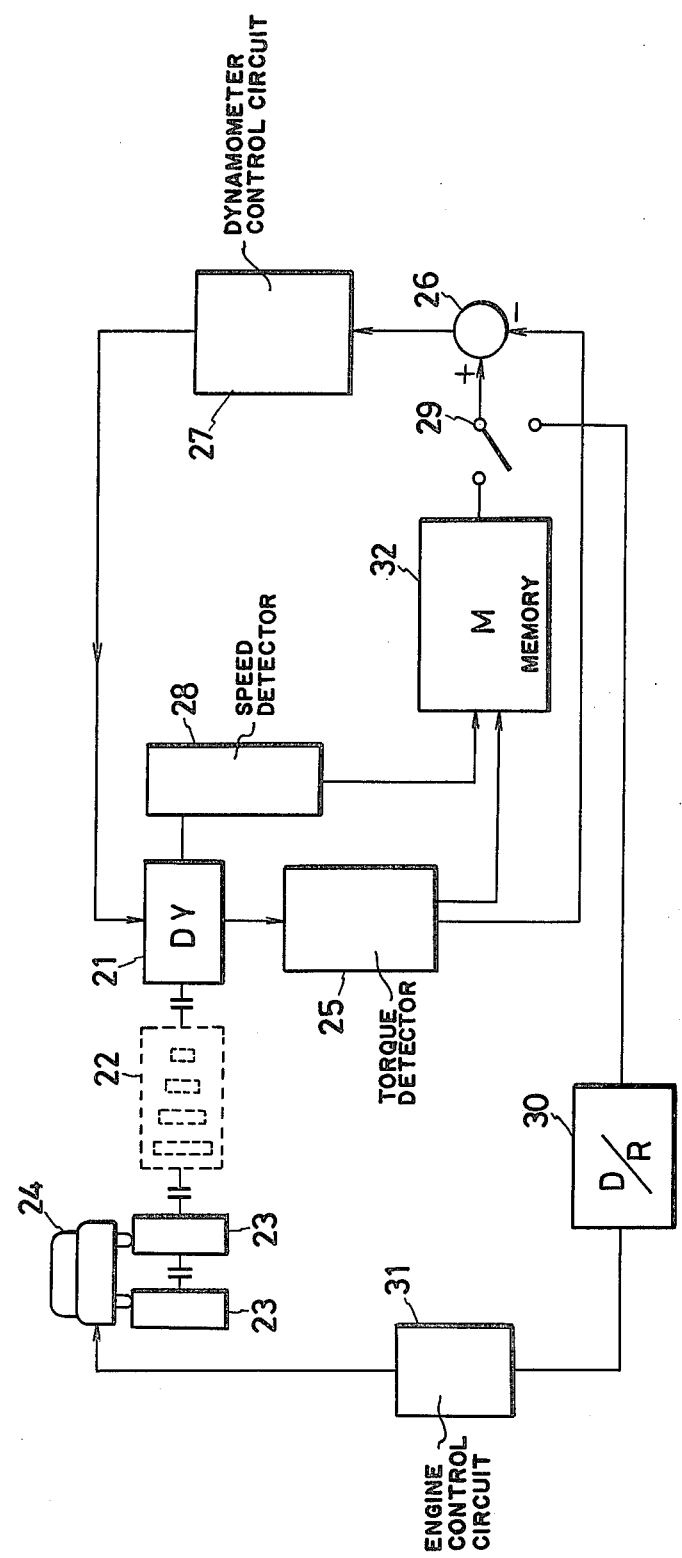
FIG. 2 is a block diagram of a drive simulator used to explain the drive simulator operating method of the present invention.

The present invention is now described in detail by way of the embodiment with reference to FIG. 2 in which a drive simulator is shown as comprising a chassis dynamometer system and a control system. The chassis dynamometer system include a dynamometer 21 having its rotary drive shaft coupled to a flywheel unit 22 and also to a roller unit 23 on which a test vehicle 24 is placed. The control system includes a torque detector 25 such as including a load cell for detecting the torque of the rotary drive shaft to provide it to one input terminal of a comparator 26 whose output terminal is connected to a dynamometer control circuit 27, and a speed detector 28 such as including a pulse pick-up associated with the dynamometer shaft for detecting the speed V of the test vehicle.

The reference numeral 30 designates a data recorder 30 which is embarked on the test vehicle to store data on the relationship between vehicle speed and any one of engine throttle opening, intake manifold pressure, and dynamometer shaft torque while the test vehicle is actually driven on a test course. The data recorder 30 is shown as connected through an engine control circuit 31 to the vehicle for controlling the test vehicle in accordance with the stored data and also connected through a switch 29 to a first of the other input terminals of the comparator 26 for providing stored road load command values thereto. The drive simulator also comprises a memory 32 which has its one input coupled to the torque detector 25 and the other input coupled to the speed detector 28 for storing data on the relationship between dynamometer torque (road load) and vehicle speed and also its output coupled through the switch 29 to a second of the other input terminals of the comparator 26 for providing stored road load command values thereto.

In accordance with the present invention, the above drive simulator is operated as follows: First, the data recorder 30 is embarked on the test vehicle to store the data on the relationship between vehicle speed and any one of engine throttle opening, intake manifold pressure, and dynamometer shaft torque while the test vehicle is actually driven on the test course in accordance with patterned drive modes. After this actual vehicle running, the data recorder 30 is connected through the engine control circuit 31 to the vehicle engine and also through the switch 29 to the first of the other input terminals of the comparator 26. The test vehicle is driven on the chassis dynamometer system with the vehicle engine controlled through the engine control circuit 31 in accordance with the data stored in the data recorder 30 and the dynamometer 21 controlled through the dynamometer control circuit 27 in accordance with the command signal which is provided from the comparator 26 as the result of comparison of road load command values from the data recorder 30 with torque values from the torque detector 25. During this the memory 32 receives torque values from the torque detector 25 and also vehicle speed values from the speed detector 28 to store the data on the relationship between torque (road load) and vehicle speed. Thereafter, the switch 29 is changed over to connect the output of the memory 32 to the second of the other input terminals of the comparator 26 and the test vehicle is driven on the chassis dynamometer system with the dynamometer 21 controlled through the dynamometer control circuit 27 in accordance with the data stored in the command signal which is provided from the comparator 26 as the result of comparison of road load command values from the memory 32 with torque values from the torque detector 25.

An important feature of the present invention resides in that such road load command values for controlling the dynamometer during drive simulation are on the basis of the data stored in the memory instead of road load command values including manually set factors as did in conventional drive simulator operating method. Since the data is stored in the memory in accordance with actual vehicle running conditions and includes all road load variations such as variations in acclivity/declivity load $W\sin\theta$, variations in wind resistance $BV^2$ due to the weather condition, and variations in load exerting on the test vehicle upon running on curved roads, the conditions simulated on the chassis dynamometer system are fully equivalent to the actual vehicle running conditions.

The drive simulator operating method of the present invention provides the following advantages: First, it provides high precise control to simulate conditions faithful to the actual running conditions since the road load control is effected with regarding all variations in actual running conditions. Second, it is easy and inexpensive to carry out since it can be applied to any existing drive simulator merely by providing a memory for storing the torque values absorbed in the dynamometer. Third, it is suitable particularly in conducting tests on vehicle transient performances under engine acceleration and deceleration conditions since it can faithfully simulate any transient characteristics under engine acceleration and deceleration.

While the present invention has been particularly shown and described with reference to a preferred embodiment thereof, it will be understood by those skilled in the art that changes in form and details may be made therein without departing from the spirit and scope of the present invention.

What is claimed is:

1. A drive simulator operating method for permitting a test vehicle to run on the dynamometer system under conditions equivalent to actual vehicle running conditions, the method comprising the steps of
storing in a data recorder on the relationship between vehicle speed and any one of engine throttle opening, intake manifold pressure, and drive dynamometer shaft torque while actually driving the test vehicle on a test course,
storing in a memory data on the relationship between vehicle speed and road load corresponding to the torque absorbed in the dynamometer while driving the test vehicle on the dynamometer system under road load control in accordance with the data stored in the data recorder, and operating the dynamometer under road load control in accordance with the data stored in the memory.

2. The drive simulator operating method as claimed in claim 1 including the step of driving the test vehicle on the test course in accordance with a patterned drive mode.

3. The drive simulator operating method as claimed in claim 1 or 2 wherein the test vehicle is driven solely by the dynamometer system in accordance with the data based on road load control stored in the memory data.

4. The drive simulator operating method as claimed in claim 1 or 2 wherein the data stored in the memory is in accordance with actual road load variations in accordance with the actual test course including variations in acclivity, declivity, wind resistance and curvature of the road.

5. The drive simulator operating method as claimed in claim 1 or 2 comprising the steps of obtaining the data on the relationship between vehicle speed and any one of the engine throttle opening, the intake manifold pressure and dynamometer shaft torque while the test vehicle is driven in accordance with patterned driving models.

* * * * *

UNITED STATES PATENT AND TRADEMARK OFFICE
CERTIFICATE OF CORRECTION

PATENT NO. : 4,186,593
DATED : February 5, 1980
INVENTOR(S) : Youichi WATANABE

It is certified that error appears in the above-identified patent and that said Letters Patent are hereby corrected as shown below:

Column 2, Line 24 "exerted" should be --exerting--

Line 27 "exerted" should be --exerting--

Line 28 "exerted" should be --exerting--

In the Claims:

Column 4, Line 62 add --data-- after the word "recorder"

Signed and Sealed this

Twenty-eighth Day of October 1980

[SEAL]

Attest:

SIDNEY A. DIAMOND

Attesting Officer

Commissioner of Patents and Trademarks